United States Patent
Chemtob et al.

[11] 3,977,835
[45] Aug. 31, 1976

[54] COOLING PROCESS FOR SELECTIVE SALT CRYSTALLIZATION

[75] Inventors: Elie M. Chemtob, Claremont; Roland V. Marcote, Reseda, both of Calif.

[73] Assignee: Occidental Petroleum Corporation, Los Angeles, Calif.

[22] Filed: Dec. 13, 1974

[21] Appl. No.: 532,737

Related U.S. Application Data

[63] Continuation of Ser. No. 284,087, Aug. 28, 1972, abandoned, which is a continuation-in-part of Ser. No. 16,171, March 3, 1970, abandoned.

[52] U.S. Cl. ........................ 23/296; 209/166; 209/167; 159/1 S; 23/298; 23/300; 23/302 T; 23/303
[51] Int. Cl.² ................ B01D 9/02; C01C 1/30; C01C 5/00; C01C 3/06
[58] Field of Search ............ 209/166, 167; 23/296, 23/297, 298, 299, 300, 302, 303; 159/1 S

[56] References Cited
UNITED STATES PATENTS

| | | | |
|---|---|---|---|
| 1,328,418 | 1/1920 | Burnham | 23/295 S |
| 1,328,614 | 1/1920 | Burnham | 23/295 S |
| 1,415,205 | 5/1922 | Stevenson | 23/295 S |
| 1,417,139 | 5/1922 | Burnham | 23/295 S |
| 1,476,873 | 12/1923 | Burnham | 23/295 S |
| 1,836,427 | 12/1931 | Allen | 23/298 |
| 1,853,275 | 4/1932 | Houghton | 23/296 |
| 1,899,310 | 2/1933 | Burnham | 23/295 S |
| 2,333,334 | 11/1943 | Pearson | 23/296 |
| 2,392,888 | 1/1946 | Suhr | 23/297 |
| 3,685,652 | 8/1972 | Chemtob | 209/166 |

*Primary Examiner*—Stephen J. Emery
*Attorney, Agent, or Firm*—Christie, Parker & Hale

[57] ABSTRACT

Salable salt values in a complex brine are recovered by cooling to crystallize mirabilite, then using solar evaporations to recover readily processable groupings of sodium salts and potassium salts.

8 Claims, 2 Drawing Figures

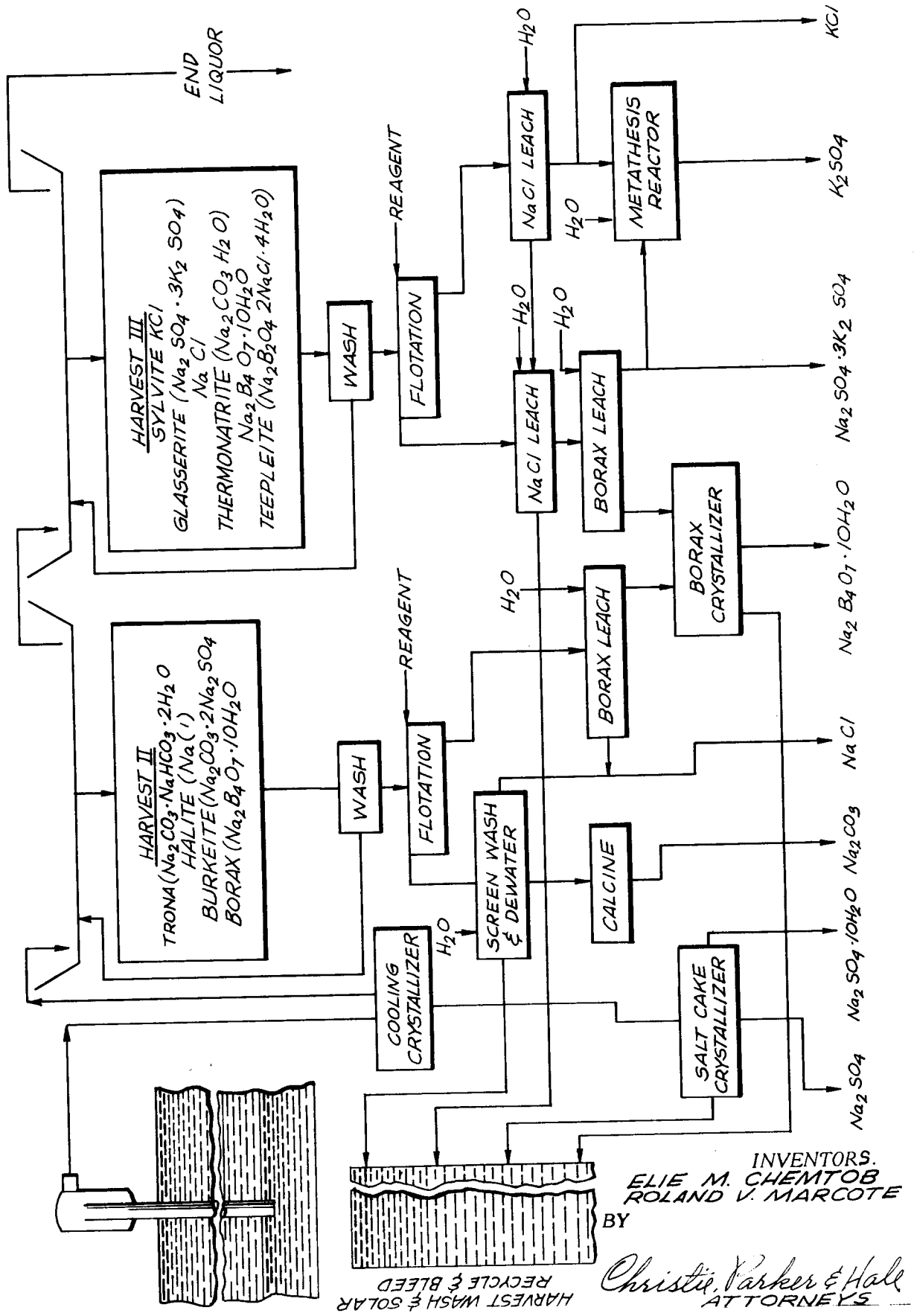

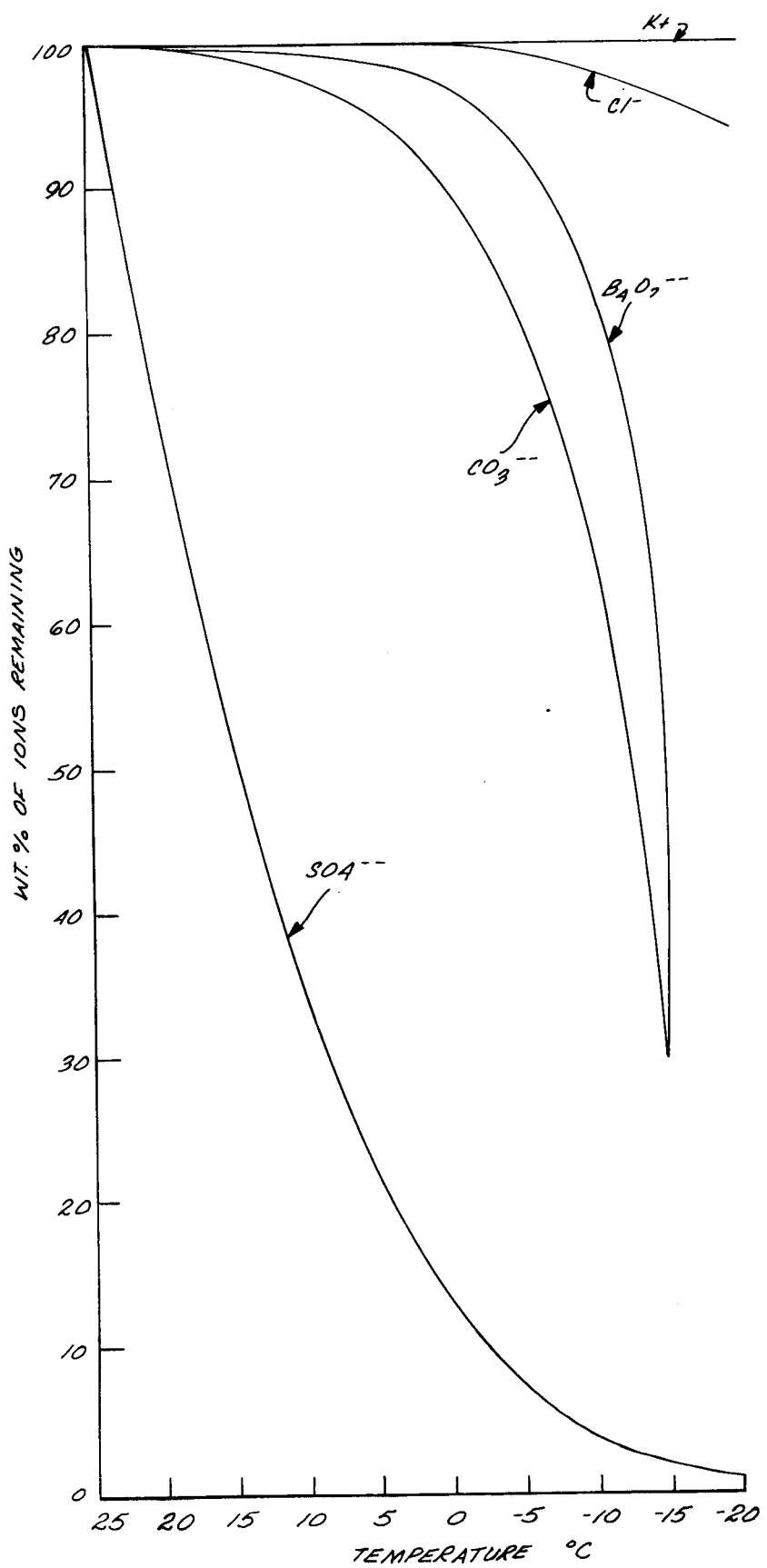

COOLING PROCESS FOR SELECTIVE SALT CRYSTALLIZATION

CROSS REFERENCE TO RELATED APPLICATION

This is a continuation Ser. No. 284,087, filed Aug. 28, 1972 (now abandoned) which is a Continuation-in-Part of Application Ser. No. 16,171 filed Mar. 3, 1970, now abandoned.

BACKGROUND OF THE INVENTION

Complex salt brines as found in saline mineral bodies, such as Searles Lake, are most difficult to separate into their salable components. Most existing processes are only adaptable for separating portions of the contained salt efficiently and usually result in the loss of what would otherwise be considered valuable salts.

With costs of processing saline mineral bodies increasing, it is evident it is becoming important to maximize the amount of salt values harvested in any one process.

Process economics have focused fresh attention on the use of solar evaporative techniques to harvest salts. While solar evaporation has long been considered a possible route to obtaining salt values from a brine, the salts normally obtained are often as equal and sometimes more complex than the salts in the original brine and no real advantage has resulted from this step, alone.

In addition, the composition of the brine has changed markedly over the years. There has been a general increase in sulfate and chloride ions due to recycle of undesired salts back to the brine. At the same time, potassium, carbonate and borate values have been decreasing due to the harvesting of glaserite, sylvite, sodium carbonate and borax.

SUMMARY OF THE INVENTION

It has now been found that readily processable salt groupings may be selectively crystallized out of a complex salt brine containing potassium, sodium, chloride, sulfate, carbonate and borate ions, such as Sealres Lake brine, by cooling the brine in at least one artificial cooling stage to a temperature sufficiently low to at least crystallize mirabilite, evaporating the brine in a first solar evaporator to crystallize out halite, or halite and burkeite, free of potassium salt values, then further concentrating the brine in a second solar evaporator to obtain a grouping of salts rich in potassium values.

In particular, the process is directed to recovery of salt values from a brine in which the potassium ion is present in an amount up to about 3 percent by weight, preferably from about 0.5 to about 2 percent by weight, carbonate ion in an amount of from about 2.5 to about 4.5 percent by weight, sulfate ion in an amount of from about 3.0 to about 6.0 percent by weight and borate ion in in an amount of from about 0.6 to about 1.2 percent by weight based on the total weight of the brine, the balance of the ionic species present being sodium ion and chloride ion.

For a brine having the above composition, the brine can be artifically cooled to extremely low temperatures, namely, as low as about −20°C. without crystallization of potassium salts.

After artificial cooling to at least 20°C. to crystallized at least mirabilite, the resultant brine can be processed in a solar evaporation stage to crystallize halite or a mixture of halite and burkeite, again, without crystallization of potassium salts. The amount of burkeite formed, if at all, is inversely proportional to temperature and will in the range of from 0 to 30 percent by weight of the sodium salts deposited, the balance being halite.

After solar evaporation to crystallize sodium salts, the brine is passed to a next solar evaporation stage where the potassium salts are deposited along with borax and other sodium salts. Depending on the degree of artificial cooling, the relative amounts of glaserite and sylvite deposited will vary. Sylvite is the most desired form and, therefore, a high degree of artificial cooling is preferred.

Although mirabilite may be obtained as the sole constituent of the artificial cooling step, the brine, as indicated, is preferably further cooled to obtain, in addition, deposition of natron and borax to yield a tertiary salt grouping and to maximize the amount of sylvite formed during solar evaporation. The constituents of tertiary salt grouping may be readily separated by particle size differential or froth floatation.

The valuable salt groupings obtained are simple and readily processable into salable products using low cost processing techniques. In additional selective salt group crystallization using cooling in combination with solar evaporation allows a total harvesting of all salts contained in a complex brine.

DRAWINGS

FIG. 1 is a flow diagram illustrating the process steps of this invention;

FIG. 2 shows the approximate amount of ions depleted from the brine during the artificial cooling stage as a function of brine temperature.

DESCRIPTION

According to the present invention, artificial cooling crystallization and subsequent solar evaporations are used to crystallize readily processable salt groupings from a complex brine, such as Searles Lake brine.

The process of this invention generally involves artificially cooling the brine to a temperature below 20°C to at least crystallize mirabilite, then passing the brine through a first solar evaporator to crystallize out a grouping of sodium salts free of potassium salts, then further evaporating the brine in another solar evaporation to crystallize a grouping of salts rich in potassium values. Cooling crystallization and selective solar evaporation fractionates the mineral content of the brine into groupings readily processable for total recovery of salable salt values.

The brine to be processed in accordance with the practice of this invention is one in which potassium ion is present in an amount up to about 3 percent by weight, preferably from about 0.5 to 2.0 percent by weight; carbotate ion is present in an amount of from about 2.5 to about 4.5 percent by weight; sulfate ion in an amount of from 3.0 to about 6.0 percent by weight and borate ion in an amount of from about 0.6 to about 1.2 percent by weight based on the total weight of the brine, the balance of the ionic species present being sodium ion and chloride ion.

The first step of the process of this invention involves artificial cooling to cause deposition of mirabilite alone or with the salts, natron and borax. With reference to FIG. 1, mirabilite is crystallized from the brine by passing the brine through a cooling system where the brine is cooled to a temperature below 20°C. to effect at least crystallization of mirabilite. Cooling may be achieved using any conventional means and a convenient method, which may be used, involves vacuum cooling accompanied by water or brine cooling in a first step to bring the system down to about 20°C., then vacuum cooling, preferably in combination with a steam ejector, to drop brine temperature, where desired, to as low as about 5°C. Two-stage cooling as aided by vacuum cooling will normally cause a crystallization of substantial quantities of mirabilite.

Where it is desired, however, to obtain greater yields of mirabilite, there may then be employed surface cooling techniques, such as countercurrent contact of the brine with ammonia flowing through a cooling coil. This cooling technique allows the brine to be cooled to any desired temperature for recovery of mirabilite with or without natron and borax. Where surface cooling crystallization is employed, the cooled brine may be returned to serve as the cooling liquid in the vacuum cooling stage before passage to a first solar evporative pond.

In the cooling crystallization of mirabilite from salt brine, a crystallite, which is substantially pure mirabilite, may be obtained at temperatures between about 2°C and 20°C with the degree of mirabilite deposition decreasing with a decrease in temperature below about 2°C due to sulfate ion depletion.

With reference to FIG. 2, normally reducing temperature to about 2°C. allows recovery of about 80 percent of the sulfate values in the brine is mirabilite, with the major portion of borax and natron remaining in solution. Below 2°C., however, borax and natron begin to appear in the solid phase in ever increasing quantities. If cooling is continued to a temperature of about −15°C., the rest of the sulfate, 80 percent of the boron and 70 percent of the carbonate contained in the brine will crystallize as a mixture of mirabilite, borax and natron.

When operating the cooling process to cause deposition of this triple salt, it is preferred to carry out cooling in two stages.

In the first stage mirabilite is recovered at some temperature between about 20°C. and about 2°C. substantially free of borax and natron. Then the system is cooled to a temperature between about 2°C and about −20°C. to allow crystallization of the balance of the mirabilite, as well as crystallization of borax and natron. Preferably, second stage cooling is carried on at a temperature between about 2°C. and about −18°C.

In the cooling crystallization, mirabilite, borax and natron will form as different particle sizes with mirabilite separating as relatively large particles, natron appearing as particles of intermediate size and borax as fine particles. This grouping is readily susceptible to gross separation by particle size differential, using screening techniques followed by recrystallization of each fraction to obtain pure salt products.

The mirabilite, natron, borax salt grouping is also amenable to separation by froth floatation, leaching and gravity separation after the initial screening.

Froth flotation, in this instance, is conveniently carried out in two stages. The first stage involves the flotation of borax from the borax-mirabilite-natron salt complex at a temperature below 20°C. using as the beneficiation reagent sulfonated fatty acids containing from about 8 to 22 carbon atoms in the chain as well as salt thereof. It is necessary to float borax from the tertiary salt grouping at this low temperature because above 20°C. the salts in this complex tend to lose their individual identities and transform into other sodium salts.

After separation of borax, the residue couple containing mirabilite and natron is subjected to the second froth flotation to recover a mirabilite float and natron residue, using as the beneficiating reagent: sulfonated alkenes, sulfonated unsaturated petroleum fractions, fatty acids and the like.

The froth flotation separations may also be used alone or in combination with separation by crystal size differential in that the crude cuts of mirabilite, borax and natron can be separately subjected to froth flotations to obtain pure end products.

As shown in FIG. 1, the mirabilite recovered in the cooling stage of this process may be recovered as such or recrystallized in a salt cake crystallizer to recover as the end product, sodium sulfate.

With reference now to FIG. 2, there is shown the manner in which the various ionic species will deposit from the brine employing the artificial cooling operation as a function of temperature. The curves are approximate in nature but give a clear indication of what is occuring. Further, the curves are for a brine having the following composition:

| Ionic Component | Conc. in Brine % by Weight |
| --- | --- |
| $K^+$ | 0.98 |
| $Cl^-$ | 10.0 |
| $SO_2^-$ | 6.0 |
| $CO_3^-$ | 3.08 |
| $B_4O_7^-$ | 0.85 |

As can be seen from the curves as brine temperature decreases, it is the sulfate ion which drops out first in the form of mirabilite. The carbonate ion which yields natron and the borate ion which yields borax are reluctant to crystallize out until a temperature of about 20°C is reached. From that point on their deposition as the sodium salts natron and borax becomes most rapid.

FIG. 2 also establishes that potassium ion concentration remains unchanged and, therefore, no deposition of potassium occurs throughout the artificial cooling operation independent of the degree of cooling carried out.

After the brine has been processed in the artificial cooling stage, the end liquor, after being possibly used to cool some of the incoming brine, is passed to a first solar evaporator where there is obtained a harvest of sodium salts substantially free of potassium values.

The harvest of sodium salts formed will be halite or a mixture of halite and burkeite and dependent on the degree of cooling carried out during the artificial cooling stage. If cooling is limited to about 20° in the artificial cooling stage, a salt pair consisting of 70% by weight halite and 30% by weight burkeite will appear whereas at −18°C only halite will deposit in the first solar evaporation stage.

The residence time of the brine in the first solar evaporator is not narrowly critical and may vary widely depending upon the degree of cooling previously employed. Generally, however, once potassium salts begin to appear in crystallate in any significant quantity, the brine is passed to a second solar evaporator pond for recovery of potassium values.

When burkeite is deposited in the first solar evaporator it floated from the halite using an alkyli sulfonate as the flotation reagent, carbonated to form sodium bicarbonate then calcined to form sodium carbonate. The halite is recovered as such.

The harvest of salts obtained in the second solar evaporation consists of halite, glaserite, sylvite, thermonatrite, borax, teepleite, and trona. The relative amounts of each will vary depending on the degree of articifical cooling carried out.

In general, salts will appear in the following ranges:

| Component | Range (% by weight) |
|---|---|
| halite | 25–30 |
| glaserite | 2–15 |
| sylvite | 12–45 |
| thermonatrite | 10–20 |
| borax | 3–5 |
| teepleite | 7–15 |
| trona | 3–8 |

The salt harvest from the second solar evaporator is generally washed to remove bitterns and then processed in the manner shown in FIG. 1 for recovery of respective salt values.

To the extent glaserite is present, and its presence will be at the high end in the case when the cooling has been carried out to only a limited degree, because of conservation of sulfate ions, it is separated from the salt grouping using froth flotation. In this step glaserite, borax and sodium chloride are froth floated using as the beneficiating reagent unsaturated fatty acids, their salts, sulfonated hydrocarbons, such as $\alpha$-eicosene, and hydrocarbon sulfates, such as sulfosuccinate. Sodium chloride is then leached from this grouping of salts and combined with the sodium chloride harvest from the first solar evaporative pond. Following this, borax is leached from the glaserite and the borax rich liquor recrystallized to recover pure borax. Glaserite may be recovered as such or converted to potassium sulfate by a metathesis reaction.

Trona and thermonatrite are extracted from the grouping of salts by froth flotation using as the beneficiating reagent cresylic acid. Both are then conveniently washed, dewatered and calcinated for production of sodium carbonate as a salable salt value.

Borax is then leached from the residue and passed to a borax crystallizer for recovery of pure borax. The solid halite, which remains, is then recovered as such or discarded.

The residue from the flotation is then leached of sodium salts, which are combined with the previous halite harvests.

The salt remaining is principally sylvite, which may be recovered as such or used in the digestion of glaserite to form potassium sulfate in a metathesis reaction carried out as set forth in U.S. Pat. No. 1,936,070 to Ritchie et al, and incorporated herein by reference.

Where economy favors the recovery of potassium sulfate as a primary product, sodium sulfate is preferably formed from mirabilite in treating the salts obtained in the cooling step and employed in a metathesis digestion reaction with potassium chloride to form potassium sulfate.

Using cooling in combination with successive solar evaporations according to the practice of this invention, allows harvesting of all salt values from the complex brine such as Searles Lake brine. As evidenced from the accompanying Drawing, each harvest is readily processed for recovery of salable values using low cost operating techniques and completely avoids the formation of salt complexes difficult to process or salt groupings which have little or no commercial value.

EXAMPLE 1

A brine obtained from Searles Lake was cooled to $-15°C$ and allowed to remain at that temperature for 16 hours. An analysis of the deposited crystals and residual liquor was made. They are shown relative to assay of the original brine in Table I.

Table I

| Liquid Phase | | | |
|---|---|---|---|
| Original Brine | | Liquid at $-15°C$ after 16 hours | |
| Component | % | Component | % |
| $K^+$ | 0.98 | $K^+$ | 1.45 |
| $Cl^-$ | 10.0 | $Cl^-$ | 14.1 |
| $SO_4^-$ | 6.0 | $SO_4^-$ | 0.20 |
| $CO_3^-$ | 3.08 | $CO_3^-$ | 1.33 |
| $B_4O_7^-$ | 0.85 | $B_4O_7^-$ | 0.35 |

| Solid Phase | | |
|---|---|---|
| | Content | Component Crystallized |
| Salt | % | % of Original |
| Mirabilite | 60.75 | $Na_2SO_4$ — 99 |
| Natron | 32.3 | $Na_2CO_3$ — 71 |
| Borax | 4.65 | $Na_2B_4O_7$ — 72 |
| Halite | 2.3 | NaCl — 7.5 |

This establishes that a substantial amount of the sulfate, carbonate and borax values can be recovered from the complex brine as the sodium salts without deposition of potassium salts.

EXAMPLE 2

A brine from Searles Lake was cooled in two stages. In a first stage the brine was cooled to about 1°C and the deposited crystals were removed and analyzed for component composition and content. The residual brine was then cooled to $-15°C$ and the deposited crystals analyzed for component composition and content. The results are shown in Table II.

Table II

| Sample | T°C | Liquid Phase Composition % | | | | |
|---|---|---|---|---|---|---|
| | | $K^+$ | $Cl^-$ | $SO_4^-$ | $CO_3^-$ | $B_4O_7^-$ |
| Lake Brine | — | 0.98 | 10.0 | 6.0 | 3.08 | 0.85 |
| 1st Stage | 1 | 1.15 | 12.35 | 1.0 | 3.32 | 0.94 |
| 2nd Stage | −15 | 1.45 | 14.1 | 0.20 | 1.33 | 0.35 |

| Sample | T°C | Solid Phase Composition | | | |
|---|---|---|---|---|---|
| | | Mirabilite | Natron | Borax | Halite |
| Lake Brine | — | — | — | — | — |
| 1st Stage | 1 | 95.0 | 5.0 | — | — |
| 2nd Stage | −15 | 22.2 | 58.1 | 8.6 | 8.1 |

EXAMPLE 3

Searles Lake brine was progressively cooled to establish the relative temperatures at which the anions/sulfate, carbonate and borate would crystallize in appreciable quantities with the sodium cation. The brine was progressively cooled in stages to 20°C, 10°C, 5°C, 0°C and −5°C. The residual anion content based on an original 100% concentration in the resultant liquors were determined. The results are shown in Table III.

Table III

| Temperature, °C | Residual Liquid Phase Concentration | | |
|---|---|---|---|
| | $SO_4^=$ | $CO_3^=$ | $B_4O_7^=$ |
| 20 | 100 | 100 | 100 |
| 10 | 43 | 95 | 98 |
| 5 | 30 | 90 | 98 |
| 0 | 19 | 82 | 88 |
| −5 | 11 | 65 | 48 |

Borax was observed to appreciably crystallize at about 2°C, at which only about 22% of the original sulfate remained in solution. Between 5° and −5°C, over 50% of the original borax crystallized.

EXAMPLE 4

In EXAMPLE 3 the rate of borax crystallization was observed to exceed the rate of natron crystallization at about −3°C. The minimum concentration of borax in the cooled brine was then determined by further cooling. Two samples of the brine were analyzed for $B_4O_7^{-2}$ content at five different temperatures, namely −11°, −16°, −17°, and −18°C.

A temperature between about −18 and −20°c represented the minimum practical realistic solubility of borax in solution.

EXAMPLE 5

The residual solutions from each of Examples 1–4 were processed using solar evaporation for recovery of remaining sodium salt values. Evaporation was at 35°–40°C to crystallize trona in preference to KCl. For each 1,000 parts by weight of the residual solution there was obtained 225 parts by weight of a crystallate containing 92 percent by weight halite and 8 percent by weight trona. No KCl crystallized. The final residual liquor (275 parts by weight) having the analysis 5.85%K; 13.2%Cl; 1.8%SO₄; 3.2%CO₃ and 1.3%B₄O₇ was then further solar evaporated for recovery of potassium chloride and related salts.

What is claimed is:

1. A cooling process for the recovery of readily processable salt groupings from a complex brine containing potassium, sodium, chloride, sulfate and borate ions which comprises the sequential steps of:
   a. artificially cooling a brine containing potassium ion in an amount up to about 3% by weight, carbonate ion in an amount of from about 2.5 to about 4.5% by weight, sulfate ion in an amount of from about 3.0 to about 6.0% by weight and borate ion in an amount of from about 0.6 to 1.2% by weight, based on the weight of the brine, the balance of the ionic species being sodium ion and chloride ion in two artificial cooling stages, the brine being cooled in the first artificial cooling stage to about 2°C to recover mirabilite substantially free of borax and natron from which mirabilite is separated and then in a second cooling stage where the brine is cooled to a temperature between about 2°C and about −20°C to obtain a salt grouping consisting essentially of mirabilite, borax and natron and free of potassium salts and recovering the salt grouping from the second cooling stage to leave a resultant brine;
   b. concentrating the resultant brine in a first solar evaporator stage to crystallize a grouping of sodium salts, said grouping of sodium salts being substantially free of potassium salts and containing burkeite in an amount up to 30% by weight, the balance being halite;
   c. concentrating the resultant brine from the first solar evaporation stage in a second solar evaporation stage to crystallize a group of salts of the following composition: halite from about 25 to about 30% by weight, glaserite from about 2 to about 15% by weight, sylvite from about 12 to about 45% by weight, thermonatrite from about 10 to about 20% by weight, borax from about 3 to about 5% by weight, teepleite from about 7 to about 15% by weight and trona from about 3 to about 8% by weight based on total weight of salts deposited in the second solar evaporation stage.

2. A process as claimed in claim 1 in which the mixture of mirabilite, natron and borax crystallized at a temperature of from 2°C to about −20°C yields crystals of mirabilite which are larger than crystals of borax and natron and crystals of natron which are larger than crystals of borax.

3. A process as claimed in claim 2 in which the mirabilite, natron and borax salts are separated by particle size differential.

4. A process as claimed in claim 1 in which the crystallized salts are separated by the steps of:
   a. subjecting the grouping of salts at a temperature below 20°C to froth flotation using as the beneficiating reagent a compound selected from the group consisting of sulfonated fatty acids containing from about 8 to about 22 carbon atoms and salts of sulfonated fatty acids containing from about 8 to about 22 carbon atoms to obtain a float containing borax and a tailing containing natron and mirabilite;
   b. floating mirabilite from the natron-mirabilite tailing by froth flotation using as the beneficiating reagent a compound selected from the group consisting of sulfonated alkenes, sulfonated unsaturated petroleum fraction and fatty acids.

5. A process as claimed in claim 1 in which the brine has a potassium ion concentration of from about 0.5 to about 2% by weight based on the total weight of the brine.

6. A process as claimed in claim 1 in which the crystallized mixture of mirabilite, natron and borax are separated by particle size diferential.

7. A process as claimed in claim 1 in which the crystallized mixture of mirabilite, natron and borax are separated by selective leaching.

8. A process as claimed in claim 1 in which the crystallized mixture of mirabilite, natron and borax are separated by gravity separation.

* * * * *